(12) United States Patent
Eissler et al.

(10) Patent No.: US 6,170,455 B1
(45) Date of Patent: Jan. 9, 2001

(54) INTERNAL COMBUSTION ENGINE

(75) Inventors: Werner Eissler, Kernen; Arnold Kaden, Remshalden; Jörg Miroll, Köngen, all of (DE)

(73) Assignee: DaimlerChrysler AG (DE)

( * ) Notice: Under 35 U.S.C. 154(b), the term of this patent shall be extended for 0 days.

(21) Appl. No.: 09/419,197

(22) Filed: Oct. 15, 1999

(30) Foreign Application Priority Data

Oct. 29, 1998 (DE) .............................................. 198 49 913

(51) Int. Cl.$^7$ ....................................................... F02B 3/00
(52) U.S. Cl. ........................ 123/193.6; 123/659; 123/661
(58) Field of Search ................................ 123/193.6, 659, 123/661, 660; 92/18 R

(56) References Cited

U.S. PATENT DOCUMENTS

| | | | |
|---|---|---|---|
| 4,170,966 | * 10/1979 | Schmidt ................................ | 123/661 |
| 4,294,207 | * 10/1981 | May ..................................... | 123/661 |
| 4,366,789 | * 1/1983 | Eckert .................................. | 123/661 |
| 5,092,289 | * 3/1992 | Bloschies et al. ................. | 123/193.6 |
| 5,230,321 | * 7/1993 | Lambert et al. ..................... | 123/661 |
| 6,019,079 | * 2/2000 | Sakurahara et al. .............. | 123/193.6 |

* cited by examiner

*Primary Examiner*—Marguerite McMahon
(74) *Attorney, Agent, or Firm*—Roland A. Fuller, III

(57) ABSTRACT

An internal combustion engine with a piston arranged in a cylinder bore, a pair of intake passages to the cylinder bore, and having a piston crown provided with a crescent-shaped depression. The inlet passages are arranged symmetrically with respect to an axis of symmetry running through the center of the cylinder bore between the two intake passages. The crescent-shaped depression formed in the piston crown extends across and is symmetrical with respect to the axis of symmetry.

21 Claims, 3 Drawing Sheets ary No. 198

INTERNAL COMBUSTION ENGINE

CROSS-REFERENCE TO RELATED APPLICATIONS

This application is related to German Application No. 198 49 913.2-13 filed in Germany on Oct. 29, 1998, the disclosure of which is incorporated herein by reference.

BACKGROUND OF THE INVENTION

1. Field of the Invention

This invention relates to an improved piston for an internal combustion engine.

2. Description of Related Art

The prior German DT 26 07 561 A1 corresponding to U.S. Pat. No. 4,170,966 issued Oct. 16, 1979 to Schmidt entitled "Mixture-Compressing Internal Combustion Engine, Especially Four-Cycle Engine" discloses an internal combustion engine of the generic type with recesses formed in the piston crown of the piston to improve the efficiency of combustion and thus reduce hydrocarbon emissions.

Further references which show internal combustion engines with recesses and depressions formed in the piston crown of the piston are German DE 196 24 227 A1, and DE 29 34 615 A1 and U.S. Pat. No. 3,797,466.

In general, piston configurations with recesses or depressions in the piston crown are used to bring about flow effects including swirling flows of various kinds in the combustion chamber it being the intention to improve the mixing of air and fuel and thus to improve homogenization of the fuel/air mixture, thus increasing combustion efficency.

There is a fundamental distinction between two different types of flow in a combustion chamber: swirling flow which is a vortical motion of the fuel/air mixture about the longitudinal axis of the cylinder of the internal combustion engine; and tumbling flow, on the other hand, which is a vortical motion about an axis parallel to a transverse axis of the cylinder. The aim of the recesses mentioned above is to reinforce the degree of turbulence within the combustion chamber defined by the cylinder or to otherwise deflect such flows.

A disadvantage with the known embodiments of recesses in the piston crown of the pistons of internal combustion engines is the still relatively poor mixing and the consequent stratification of the fuel/air mixture in the combustion chamber and the associated increase in the tendency to knock, despite the efforts made to bring about flow effects.

SUMMARY OF THE INVENTION

It is therefore the object of the present invention to provide an internal combustion engine in which air and fuel are mixed externally of the combustion chamber and a piston having a crown configured in such a way that the tumbling flow of the air/fuel mixture about a transverse axis is deflected or influenced in such a way that: good mixing of the fuel/air mixture is thereby achieved; unwanted stratification of the fuel/air mixture in the cylinder is prevented; and thus the tendency to knock is reduced.

According to the invention, a piston crown of a piston of an Otto-type internal combustion engine includes a substantially crescent-shaped depression which is substantially symmetrical with respect to an axis of symmetry of a cylinder bore housing the piston.

The piston's crown configuration of the subject invention includes a crescent-shaped depression so that the fuel/air mixture can be more accurately directed to the region adjacent the spark plug by tumbling flow during the compression process. The piston crown configuration produces better mixing and homogenization of the fuel/air mixture and an associated reduction in the tendency to knock and also reduces the average distance between the spark plug and the fuel/air mixture in the combustion chamber. In this arrangement, the fuel is mixed with the air required for combustion outside the cylinder, this being referred to as external mixture formation, by intake-pipe injection, for example.

The arrangement according to the subject invention including the crescent-shaped depression in the piston crown of the piston permits space for positioning more than one spark plug and furthermore allows the combustion chamber to be made more compact. This produces a smaller ratio of surface area to volume of the combustion chamber, i.e. to a smaller eccentricity and to a smaller distance between the cylinder wall and the spark plug thus resulting in a more compact combustion chamber which is less sensitive to knock. The above features increase the rated output of the engine while keeping the same displacement of the internal combustion engine and allows fuel consumption to be reduced during part-load engine operation.

BRIEF DESCRIPTION OF THE DRAWINGS

Advantageous refinements and developments of the invention will become apparent from the following description of the embodiment and with reference to the drawing, in which.

DESCRIPTION OF THE PREFERRED EMBODIMENT(S)

Figure 1:
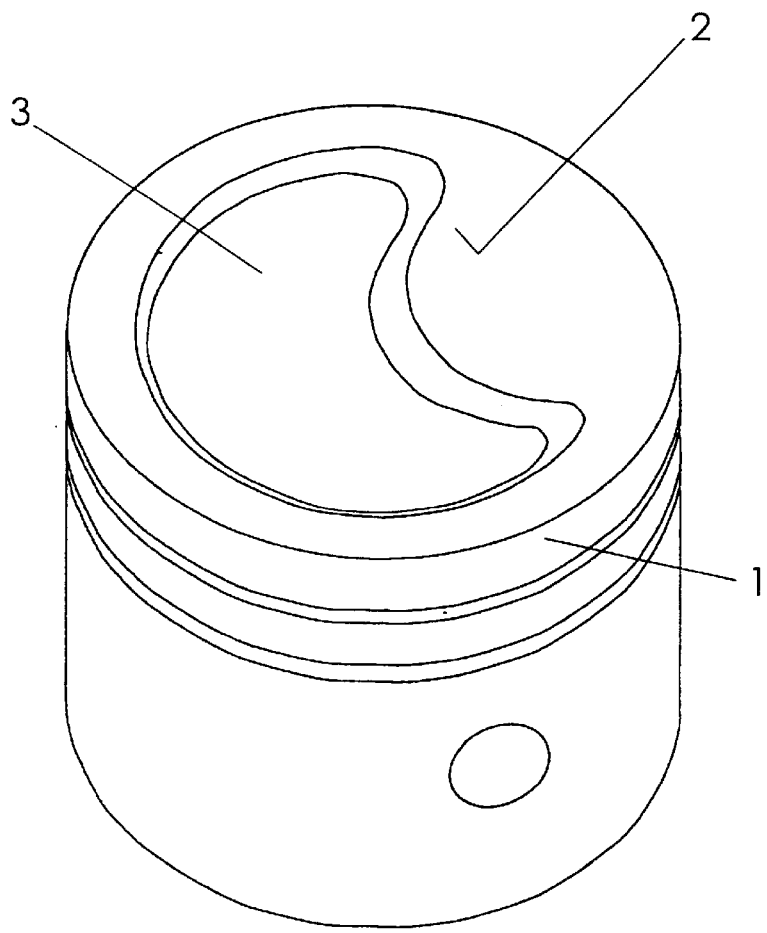
FIG. 1 shows a perspective representation of a piston of an internal combustion engine with a depression formed in the crown of the piston in accordance with the invention.
Figure 3:
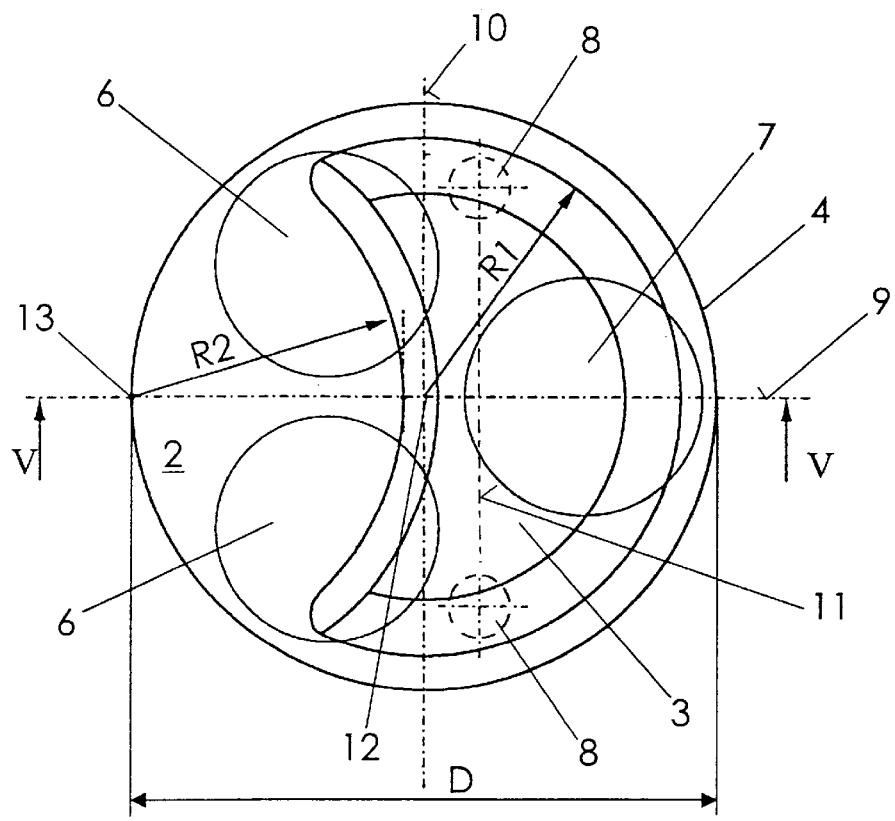
FIG. 3 shows a plan view of the piston shown in FIG. 1 in relation to three valves and two spark-plugs.
Figure 4:
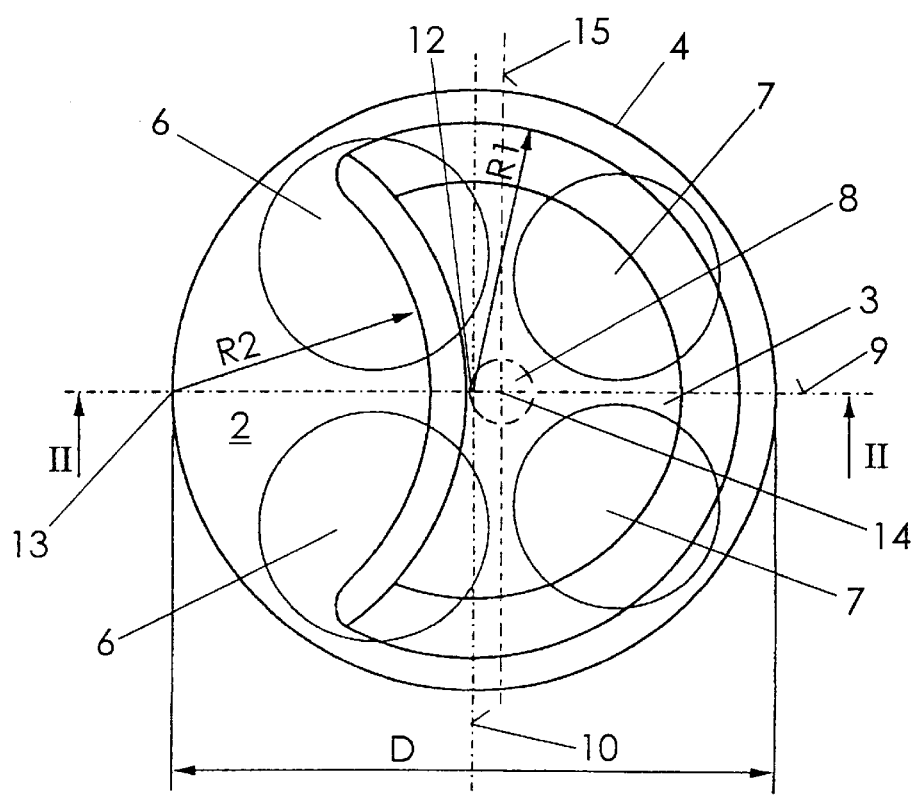
FIG. 4 shows a plan view of the piston shown in FIG. 3 in relation to four valves and a spark-plug.

In FIG. 1, a piston 1 of an Otto-type internal combustion engine is partially shown. The piston 1 is adapted to be used with an engine in which fuel is introduced to air externally of the combustion chamber. The crown 2 of the piston 1 has a crescent-shaped or kidney-shaped depression 3 formed in a piston crown 2 of the piston 1, as seen in the perspective view of FIG. 1. As is known in the engine art, piston 1 performs a translatory motion or reciprocates in a cylinder bore 4 which is illustrated in FIG. 3 and FIG. 4. This reciprocal motion is converted to rotary movement of a crankshaft (not shown) in a known manner by means of a connecting rod (not shown).

Figure 2:
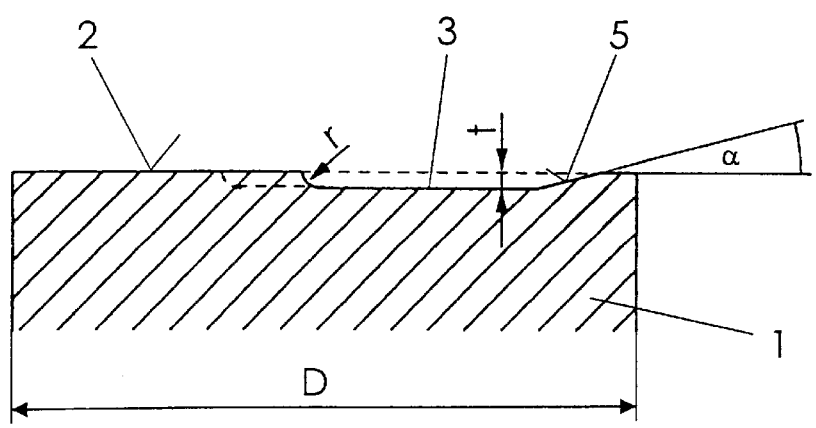
FIG. 2 shows a sectioned elevational view taken along the line II—II in FIG. 4.

The view in FIG. 2 shows a section extending laterally through the piston 1 and the crescent-shaped depression 3 formed in the piston crown 2 of the piston 1. It also shows the geometrical depth dimension on the z axis of the crescent-shaped depression 3. The angle α of a wall bevel 5 extends along an outer radius R1—visible in FIG. 3 and FIG. 4—of the crescent-shaped depression 3 relative to the uppermost surface of the piston crown 2 of the piston 1. This angle is formed preferably between 1020 to 15° for instance. A depth t of the crescent-shaped depression 3 is preferably 0.05 times the diameter D of the cylinder. A transitional radius provided along an inner radius R2 as shown in FIG. 3 and FIG. 4, extends between the crescent-shaped depression 3 and the piston crown 2 of the piston 1. The transitional radius r is preferably 0.06 times the cylinder diameter D.

In FIG. 3 a plan view of the piston crown 2 of the piston 1 of the internal combustion engine is shown. Associated with this combustion chamber layout, two inlet ports 6 and an exhaust port 7 are indicated although the associated valves are not shown. FIG. 3 also shows, in broken lines, the placement of two spark plugs 8 supported in the cylinder head housing the internal combustion engine (not shown). Also shown is a crescent-shaped depression 3 in the piston crown 2 of the piston 1. The two spark plugs 8, the two inlet ports 6, the exhaust port 7 and the crescent-shaped depression 3 formed in the piston crown 2 of the piston 1 are positioned symmetrically with respect to an axis 9 of symmetry of the piston 1 running laterally or perpendicularly to the cylinder bore 4. Each one of the two inlet ports 6 are positioned in a quadrant of the cylinder bore 4. The exhaust port 7 is centrally positioned on the axis 9 of symmetry in the other half of the cylinder bore 4. The spark plugs 8 are situated between the inlet ports 6 and the exhaust ports 7, on a line 11 parallel to a transverse axis 10 arranged in the same plane at right angles to the axis 9 of symmetry, on the side of the exhaust port 7 facing the inlet ports 6. The outer radius R1 of the crescent-shaped depression 3 extends concentrically with respect to the cylinder bore 4 and has a dimension equal to approximately 0.5 times the cylinder diameter D minus approximately 0.05 times the cylinder diameter D, with its center 12 corresponding to the center of the cylinder bore 4. An inner radius R2 of the crescent-shaped depression 3 is determined from the longer of the two distances between the cylinder bore 4 and the transverse axis 10, minus approximately 0.1 times the cylinder diameter D, starting from a point 13 located at the intersection between the cylinder bore 4 and the axis 9 of symmetry, in the half portion of the cylinder in which the inlet ports 6 are arranged.

In FIG. 4 the same piston crown configuration 2 of the same piston 1 as in FIG. 3 is illustrated but two exhaust ports 7 and just one spark plug 8 are supported in the cylinder head located above the piston 1. The positions of the inlet ports 6 correspond to those in FIG. 3. The exhaust ports 7 are each formed in a quadrant of the cylinder bore 4. The spark plug 8 is positioned at the point of intersection 14 between a line 15 extending parallel to the transverse axis 10 and the axis 9 of symmetry, the line 15 being located in that half of the cylinder bore 4 in which the exhaust ports 7 are arranged.

Figure 5:
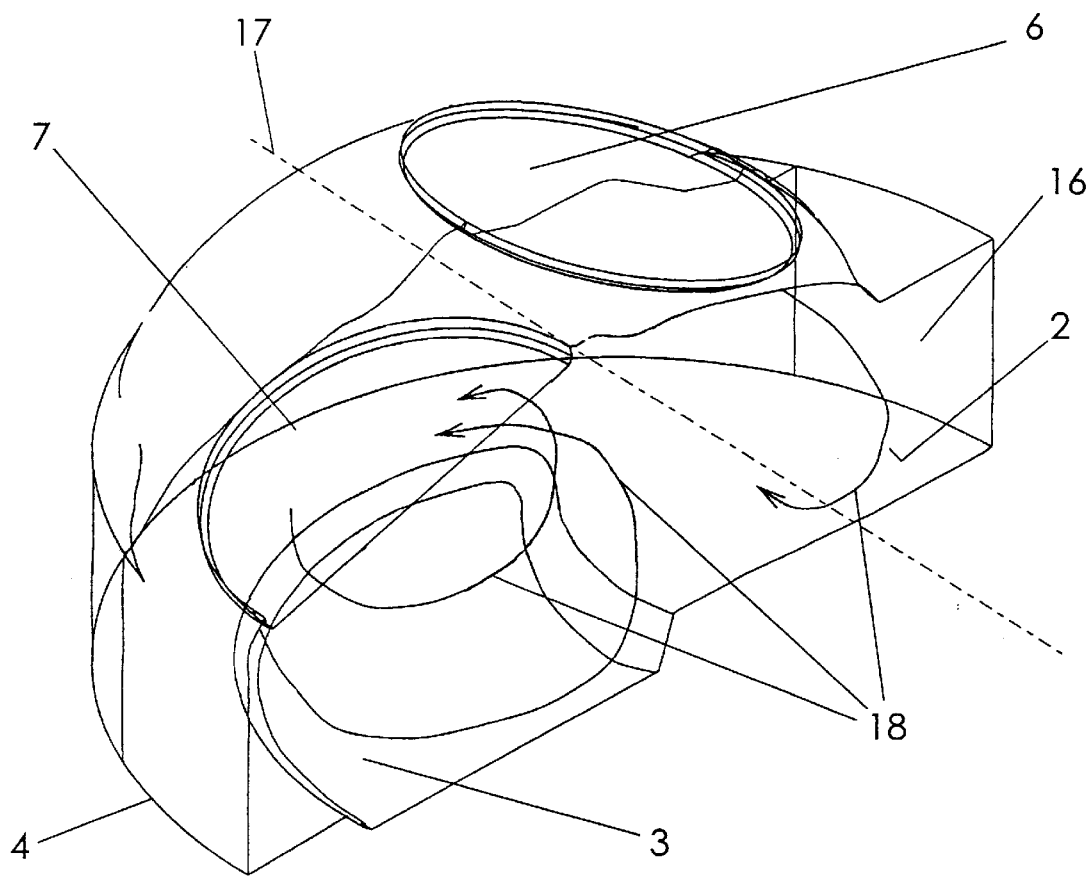
FIG. 5 shows a perspective type view of a section through the combustion chamber of the internal combustion engine taken along the line V—V in FIG. 3.

In FIG. 5 a perspective and sectioned view taken along section line V—V which extends through a portion of the combustion chamber 16 above the piston 1. One of the two inlet ports 6 and half of the exhaust port 7 are shown.

Moreover, FIG. 5 shows the deflection or redirection of a swirling flow about a transverse axis 17 of the cylinder bore 4 caused by the crescent-shaped depression 3. This flow pattern being typical in a combustion chamber of an internal combustion engine with two inlet ports 6 and with fuel being mixed with air externally of the combustion chamber. This type of flow pattern being referred to as tumbling flow 18 mostly or primarily induced by the two inlet ports 6.

It should be understood that various changes and modifications can be made in the devices and arrangements described above without departing from the spirit of the invention. Such changes and modifications are contemplated by the inventors and they does not wish to be limited except by the scope of the appended claims.

We claim:

1. Internal combustion engine, in particular Otto-type internal combustion engine with external mixture formation, which has at least one piston arranged in a cylinder bore and having a piston crown provided with at least one depression and which has, for each cylinder bore, at least one spark plug and two inlet passages, which are arranged at least approximately symmetrically with respect to an axis of symmetry running at least approximately through the center of the cylinder bore and at least approximately perpendicular to the cylinder bore, characterized in that the piston crown of the piston has an at least approximately crescent-shaped depression which is at least approximately symmetrical with respect to the axis of symmetry.

2. Internal combustion engine according to claim 1, characterized in that the at least one spark plug is situated at least approximately on the axis of symmetry.

3. Internal combustion engine according to claim 1, characterized in that two spark plugs are arranged in the cylinder bore, the said spark plugs being situated at least approximately symmetrically with respect to the axis of symmetry.

4. Internal combustion engine according to claim 1, characterized in that an outer radius of the crescent-shaped depression in the piston crown of the piston, the radius being arranged at least approximately concentrically with respect to the cylinder bore, amounts to half a diameter of the cylinder bore minus at least approximately 0.05 times the cylinder bore diameter.

5. Internal combustion engine according to claim 1, characterized in that an angle of a wall bevel of the crescent-shaped depression relative to the piston crown of the piston is 10° to 15°.

6. Internal combustion engine according to claim 1, characterized in that a depth of the crescent-shaped depression of the piston is approximately 0.05 times a diameter of the cylinder bore.

7. Internal combustion engine according to claim 1, characterized in that a transitional radius provided along an inner radius, between the piston crown and the crescent-shaped depression of the piston is approximately 0.06 times a diameter of the cylinder bore.

8. Internal combustion engine according to claim 2, characterized in that an outer radius of the crescent-shaped depression in the piston crown of the piston, the radius being arranged at least approximately concentrically with respect to the cylinder bore, amounts to half a diameter of the cylinder bore minus at least approximately 0.05 times the cylinder bore diameter.

9. Internal combustion engine according to claim 3, characterized in that an outer radius of the crescent-shaped depression in the piston crown of the piston, the radius being arranged at least approximately concentrically with respect to the cylinder bore, amounts to half a diameter of the cylinder bore minus at least approximately 0.05 times the cylinder bore diameter.

10. Internal combustion engine according to claim 2, characterized in that an angle of a wall bevel of the crescent-shaped depression relative to the piston crown of the piston is 10° to 15°.

11. Internal combustion engine according to claim 3, characterized in that an angle of a wall bevel of the crescent-shaped depression relative to the piston crown of the piston is 10° to 15°.

12. Internal combustion engine according to claim 4, characterized in that an angle of a wall bevel of the crescent-shaped depression relative to the piston crown of the piston is 10° to 15°.

13. Internal combustion engine according to claim 2, characterized in that a depth of the crescent-shaped depression of the piston is approximately 0.05 times a diameter of the cylinder bore.

14. Internal combustion engine according to claim 3, characterized in that a depth of the crescent-shaped depression of the piston is approximately 0.05 times a diameter of the cylinder bore.

15. Internal combustion engine according to claim 4, characterized in that a depth of the crescent-shaped depression of the piston is approximately 0.05 times a diameter of the cylinder bore.

16. Internal combustion engine according to claim 5, characterized in that a depth of the crescent-shaped depression of the piston is approximately 0.05 times a diameter of the cylinder bore.

17. Internal combustion engine according to claim 2, characterized in that a transitional radius provided along an inner radius between the piston crown and the crescent-shaped depression of the piston is approximately 0.06 times a diameter of the cylinder bore.

18. Internal combustion engine according to claim 3, characterized in that a transitional radius provided along an inner radius between the piston crown and the crescent-shaped depression of the piston is approximately 0.06 times a diameter of the cylinder bore.

19. Internal combustion engine according to claim 4, characterized in that a transitional radius provided along an inner radius between the piston crown and the crescent-shaped depression of the piston is approximately 0.06 times a diameter of the cylinder bore.

20. Internal combustion engine according to claim 5, characterized in that a transitional radius provided along an inner radius between the piston crown and the crescent-shaped depression of the piston is approximately 0.06 times a diameter of the cylinder bore.

21. Internal combustion engine according to claim 6, characterized in that a transitional radius provided along an inner radius between the piston crown and the crescent-shaped depression of the piston is approximately 0.06 times a diameter of the cylinder bore.

* * * * *